United States Patent
Scott-Emuakpor et al.

(10) Patent No.: US 11,305,352 B2
(45) Date of Patent: Apr. 19, 2022

(54) POWDER FUSED COMPONENTS WITH UNIQUE INTERNAL STRUCTURES FOR DAMPING

(71) Applicant: Government of the United States, as represented by the Secretary of the Air Force, Wright-Patterson AFB, OH (US)

(72) Inventors: Onome Scott-Emuakpor, Beavercreek, OH (US); Tommy George, Germantown, OH (US); Brian Runyon, Fairborn, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 564 days.

(21) Appl. No.: 16/352,197

(22) Filed: Mar. 13, 2019

(65) Prior Publication Data

US 2020/0290122 A1   Sep. 17, 2020

(51) Int. Cl.
| | |
|---|---|
| *B33Y 10/00* | (2015.01) |
| *B33Y 80/00* | (2015.01) |
| *B33Y 50/00* | (2015.01) |
| *B22F 10/20* | (2021.01) |
| *B22F 10/30* | (2021.01) |

(52) U.S. Cl.
CPC .............. *B22F 10/20* (2021.01); *B33Y 10/00* (2014.12); *B33Y 50/00* (2014.12); *B33Y 80/00* (2014.12); *B22F 10/30* (2021.01); *B22F 2301/15* (2013.01)

(58) Field of Classification Search
CPC ...... B22F 10/20; B22F 10/30; B22F 2301/15; B22F 5/10; B22F 9/082; B33Y 10/00; B33Y 50/00; B33Y 80/00; Y02P 10/25; F16F 15/02
See application file for complete search history.

(56) References Cited

U.S. PATENT DOCUMENTS

| | | | | |
|---|---|---|---|---|
| 3,517,328 | A * | 6/1970 | Javan ................... | H01S 3/1398 |
| | | | | 372/32 |
| 8,300,227 | B2 * | 10/2012 | Chism, II ............... | G01N 21/55 |
| | | | | 356/445 |
| 10,207,489 | B2 * | 2/2019 | Dave ...................... | B33Y 30/00 |
| 10,717,264 | B2 * | 7/2020 | Dave ...................... | G01N 21/71 |
| 2010/0315646 | A1 * | 12/2010 | Chism, II ............... | G01N 21/55 |
| | | | | 356/445 |
| 2012/0060468 | A1 | 3/2012 | Dushku et al. | |
| 2016/0158889 | A1 | 6/2016 | Carter et al. | |

(Continued)

FOREIGN PATENT DOCUMENTS

WO       2016111896 A1     7/2016

*Primary Examiner* — Lawrence Averick
(74) *Attorney, Agent, or Firm* — AFMCLO/JAZ; Chastity D. S. Whitaker (57) ABSTRACT

Methods, architectures, mechanisms and/or apparatus configured to manufacture a component (and components manufactured thereby) by optimizing a location of an internal feature of the component to be manufactured using powder fusion additive manufacturing (PFAM) based on an energy release rate being proportional to the third derivative of a component shape function and the shape function itself; the internal feature comprising one or more cavities having unfused powder disposed therein to provide vibration dampening.

8 Claims, 9 Drawing Sheets

(56) References Cited

U.S. PATENT DOCUMENTS

| | | |
|---|---|---|
| 2017/0001243 A1 | 1/2017 | Hayano |
| 2017/0021455 A1* | 1/2017 | Dallarosa et al. |
| 2017/0090462 A1* | 3/2017 | Dave .................... G01N 21/71 |
| 2017/0120335 A1 | 5/2017 | DeMuth et al. |
| 2017/0182595 A1 | 6/2017 | Nelson et al. |
| 2017/0246683 A1 | 8/2017 | Jones et al. |
| 2017/0341145 A1 | 11/2017 | Foster et al. |
| 2017/0368608 A1 | 12/2017 | Homma et al. |
| 2019/0210353 A1* | 7/2019 | Dave .................... G01N 21/00 |

* cited by examiner

| Beam Type | Mass (g) | Total | | Unfused pocket | |
|---|---|---|---|---|---|
| | | Volume (cm³) | Density (g/cm³) | Volume (cm³) | Density (g/cm³) |
| (not shown) Solid (fused) | 123.543 | 14.868 | 8.309 | 0 | 0 |
| 34 Middle | 123.212 | 15.181 | 8.116 | 0.1991 | 6.6466 |
| 32 Tip | 123.366 | 15.188 | 8.123 | 0.1991 | 7.4202 |
| 36 Two Pocket | 122.392 | 14.977 | 8.172 | 0.3981 | 5.4183 |
| 30 Three Pocket | 121.913 | 15.236 | 8.002 | 0.5972 | 5.5799 |

| Beam Type | Q | | |
|---|---|---|---|
| | 1st Bend | 2nd Bend | 3rd Bend |
| (not shown) Solid | 297 | 1383 | 1046 |
| 34 Middle | 330 | 172 | 140 |
| 32 Tip | 294 | 389 | 152 |
| 36 Two Pocket | 354 | 468 | 141 |
| 30 Three Pocket | 277 | 150 | 121 |

POWDER FUSED COMPONENTS WITH UNIQUE INTERNAL STRUCTURES FOR DAMPING

GOVERNMENT INTEREST

The embodiments described herein may be manufactured, used and/or licensed by or for the United States Government without the payment of royalties thereon.

FIELD OF THE DISCLOSURE

The embodiments herein generally relate to an additive manufacturing process, and more particularly, to a powder fusion additive manufacturing process that can fabricate components with unique internal geometries capable of inherently suppressing vibration.

BACKGROUND

Vibration suppression is frequently considered when designing components. For instance, design thresholds for gas turbine engines are constantly pushed to improve performance. One aspect of design improvement is the reduction of weight in rotating components. Specifically, the inserted airfoil and disk combinations more often seen in legacy fleets are seldom preferred to integrally bladed rotors (IBRs) which weigh less and significantly improve turbine engine performance. Despite the tremendous performance benefits provided by IBRs, their implementation is not without penalties. One notable disadvantage is the loss of airfoil-to-disk energy dissipation via friction (i.e. damping). The absence of this interaction increases the susceptibility of airfoils to vibration. Therefore, high cycle fatigue (HCF) is a more prevalent issue in IBRs than bladed-disks and could lead to catastrophic engine failure. The possibility of such an event is why HCF is addressed from the inception of conceptual design throughout the life cycle of critical parts like IBRs. During design, it is intended that critical components be manufactured to avoid critical HCF loading. However, when the phenomenon is unavoidable and does not significantly degrade performance, post-design as well as operational measures, specifically vibration suppression and engine speed avoidance, are considered to sustain the life of a part.

Vibration suppression has been investigated for a number of years and yielded unique techniques such as viscoelastic treatment, hard coatings (ceramic- and metallic-based), as well as impact and friction dampers. Though each method has been proven effective, all have short comings that make them less than ideal for turbine engine or other applications. Viscoelastic approaches are hampered by bond strength issues in extreme, rotating environments, and hard coatings add weight, reduce flow path area, and increase the likelihood of stress concentrations on the substrate. Impact and friction dampers, like hard coatings, add weight, are challenging to implement, and may introduce wear/fretting damage.

SUMMARY OF THE INVENTION

Various deficiencies in the prior art are addressed by systems, methods, architectures, mechanisms and/or apparatus configured to manufacture a component (and components manufactured thereby) by optimizing a location of an internal feature of the component to be manufactured using laser powder bed fusion additive manufacturing (LPBFAM) based on an energy release rate being proportional to the third derivative of a component shape function and the shape function itself; the internal feature comprising one or more cavities having unfused powder disposed therein to provide vibration damping.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Generally speaking, the various embodiments disclosed herein provide an additive manufacturing (AM) process that may be used to fabricate components with unique internal geometries capable of reducing weight and inherently suppressing vibration. Using a laser powder bed fusion (LPBF) AM process, unique design examples illustrate the damping effectiveness of this manufacturing concept. Results of several forced-response tests validate the damping capability of each internal design configuration created using the LPBF AM process. With only 1-4% internal beam volume alteration, the unique design examples are capable of providing significant damping into their respective systems compared to a baseline, solid component.

The intuitive notion behind using AM is driven by theoretical applications of friction and impact dampers. More specifically, the concept of particle dampers has shown promise in suppressing vibration, and the same concept can be applied with a more feasible manufacturing approach like AM. Particle damping has proven capable in cryogenic environments, used to reduce vibration of space shuttle liquid oxygen inlets, and used to reduce vibration in tennis racquets. Despite successful applications for particle damping, quantifying the dissipated energy loss mechanisms associated with vibration suppression is complicated. This has led to unreliable pre- and post-predictive models, forcing a trial and error approach that makes optimization for maximum performance with minimal uncertainty difficult.

The LPBF AM process is more desirous than conventional particle dampers for two reasons. First, the one-step process of AM can improve the manufacturability of particle imbedded parts. Second, by using the AM process feedstock as damping particles, the mechanism of friction/impact behavior is simplified with a densely packed interior pocket. This internal feature concept can minimize the uncertainty associated with impact behavior by eliminating it all together.

Figure 1:
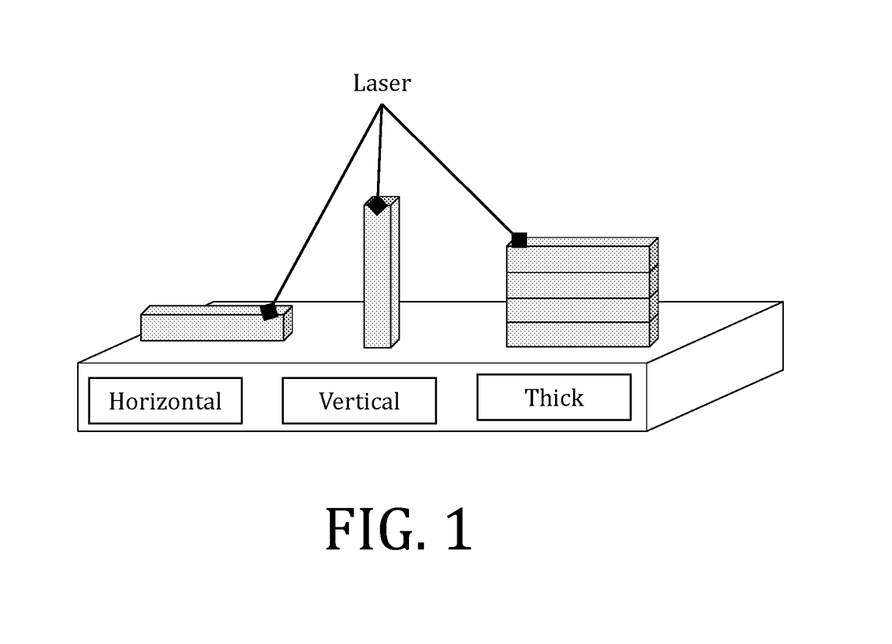
FIG. 1 depicts a laser powder bed fusion (LPBF) process according to an embodiment of the present invention.

Manufacturing is achieved with the LPBF approach 10 as illustrated by FIG. 1. The machine used for manufacturing parts is a laser 12 with open control parameters. This AM approach 10 is chosen based on the ability to manufacture closely-packed, unfused powder pockets (also referred to as cavities) as an imbedded feature within specimens. In one embodiment, the machine used is a Concept Laser M2 and the feedstock material is gas atomized (GA) Inconel 718. In alternative embodiments, other gas atomized or plasma atomized feedstock material may be used. As nonlimiting examples, other nickel or titanium-based alloys, like titanium 64, may be used, as well as cobalt-chrome or ferric alloys. Furthermore, any powder fusion machine may be used instead of the concept laser M2, such as any directed energy deposition (DED) machine, electron beam machine, direct metal laser sintering (DMLS) machine, direct metal laser melting (DMLM) machine, or selective laser melting (SLM) machine, as nonlimiting examples. The key process parameters used are laser power (370 W), speed (700 mm/s), spot size (180 μm), and hatch distance (130 μm), but it is to be noted that other parameters may be used in other embodiments. Powder flowability/interaction as it affects the damping capability of the unfused pocket is of primary concern.

A physics-based approach is applied for optimizing the placement of unfused powder pockets that will provide effective damping performance. First, loss factor calculation is deconstructed. Loss factor of a system can be calculated by Eq. (1), where D is the total dissipated energy and U is the maximum stored (potential) energy per cycle.

$$\eta = \frac{1}{Q} = \frac{D}{2\pi U} \quad (1)$$

In the case of an unfused powder pocket in vibration bending, the dissipated energies acting on the system are generated by the fused (solid) material, internal unfused powder pocket, and clamp motion; the same is the case of stored energy. For the sake of understanding damping in the unfused powder pockets, energy dissipated by the clamp is assumed to be defined within the fused material energy. Therefore, Eq. (1) can be rewritten as a function of dissipated energy via fused and unfused material only, and the maximum unfused powder pocket stored energy is assumed to have negligible effects (1-4%) on overall damping. This energy separation is reflected in Eq. (2). Eq. (3) is the stored strain energy density of the fused material.

$$\frac{1}{Q} = \frac{D_{unfused} + D_{fused}}{2\pi U_{fused}} \quad (2)$$

$$U_{fused} = \frac{\varepsilon_{fused}^2 E}{2} \quad (3)$$

Since components do not undergo conventional heat treatment procedures, published moduli are not used to calculate maximum stored energy. Instead, beam theory is applied to the response of the solid component sine sweeps and the modulus is back calculated with respect to component dimensions and test frequency. The resulting modulus of a solid LPBF beam (in this embodiment Inconel 718) is roughly 23% less than typical (147 MPa).

The dissipated energy in the unfused powder pocket is calculated to understand how total energy correlates to Q values. To determine dissipated energy in the unfused powder pocket, $U_{fused}$ used and $D_{fused}$ are calculated with Eqs. (1) and (3). Using Eq. (1) and incorporating Q from solid component sine sweeps, the total dissipated energy in the volume of the beam can be determined by Eq. (4).

$$D_{fused} = \eta_{fused} \int (\pi \varepsilon_{fused}^2 E) dV_{fused} \quad (4)$$

Incorporating volumetric version of Eqs. (3) (i.e. $\int dV_{fused}$) and (4) into Eq. (2) yields total dissipated energy in the unfused powder pocket. As expected, there is no correlation between Q and the magnitude of the dissipated energy in the pocket: it is correlated to strain and the value cancels out of the equation. In other words, damping performance has negligible dependence to frequency response amplitude. Furthermore, the mechanism associated with damping performance can be understood by simply studying the normalized vibratory mode behavior as opposed to associating damping to a specific frequency response quantity.

Figure 2:
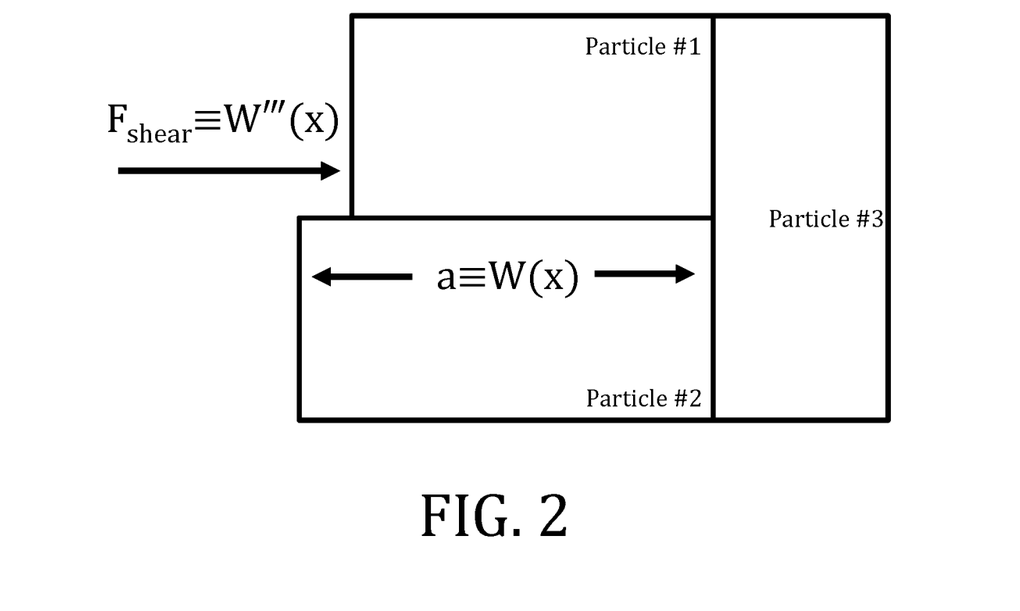
FIG. 2 depicts a schematic of particle motion in a densely packed volume according to an embodiment of the present invention.

A specific descriptor of the unfused powder pocket is that it is densely (or closely) packed. This means there is minimal space for particle movement. The only motion assumed between two particles in a densely packed pocket is sliding. Furthermore, taking into consideration normal distribution of particles, the contact surface of each particle is most likely to have an end wall. This logic leads to the schematic in FIG. 2, which is similar to a crack opening under mode II fracture. Assuming mode II fracture, energy generated by particle motion is related to stress intensity factor at the crack tip (i.e. the end wall of the two particles). For a more acceptable unit of energy, the energy release rate of the motion in FIG. 2 can be associated with the energy dissipated per cycle.

The energy release rate (G) in terms of mode II stress intensity factor ($K_{II}$) is represented by Eq. (5). The function for $K_{II}$ with the shear stress and crack length ($\alpha$) of mode II fracture is in Eq. (5) as well.

$$G = \frac{K_{II}^2}{E} = \frac{\tau^2 a \pi}{E} \quad (5)$$

Assuming that the crack length is the average length of surface contact per particle, the $K_{II}$ for crack surfaces sliding is determined by displacement of the component and the associated shear force. From the free body diagram calculation of an infinitesimal element in transverse vibration, shear force is proportional to the third derivative of an ideal component shape function, and displacement is proportional to the component shape function itself. Therefore, the energy release rate, which is correlated to energy dissipated per cycle, is proportional to the term in the expression, Eq. (6).

$$G = K_{II}^2 = [W'''(x)]^2 * W(x) \quad (6)$$

Damping validation was performed using beams with dimensions that are appropriate for forced-response vibration testing. For a clamped-free beam, to be discussed in further detail below, the shape function W(x) is described in Eq. (7), $$W(x) = \cosh(\beta_n x) - \cos(\beta_n x) - \sigma_n [\sinh(\beta_n x) - \sin(\beta_n x)] \quad (7)$$

where, $$\beta_n = \frac{\beta_n L}{L} \text{ and } \sigma_n = \frac{[\cosh(\beta_n L) - \cos(\beta_n L)]}{[\sinh(\beta_n L) - \sin(\beta_n L)]}.$$

Here, $\beta_n L$ is the weighted natural frequency, L is the beam length, $\sigma_n$ is the weighted frequency coefficient, and x is the position along the beam length. However, this invention is not limited just to beams, but may involve a component of any type or shape for vibration suppression, such as but not limited to any aerospace, space, or automotive component. One skilled in the art would understand which shape function to use based on the component design.

Figure 3:
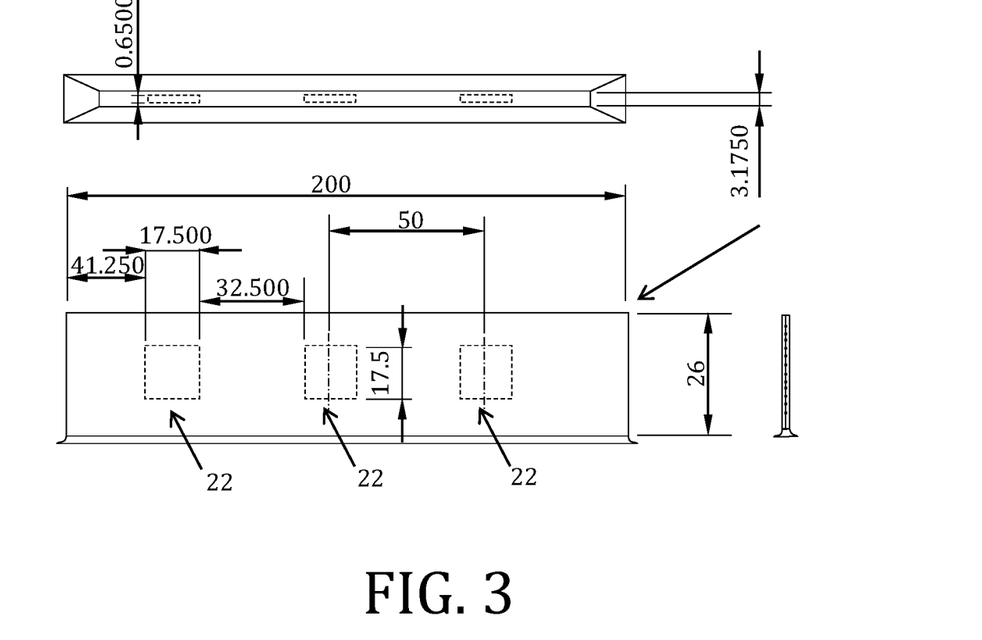
FIG. 3 depicts a LPBF beam with pocket dimensions according to an embodiment of the present invention.
Figure 4:
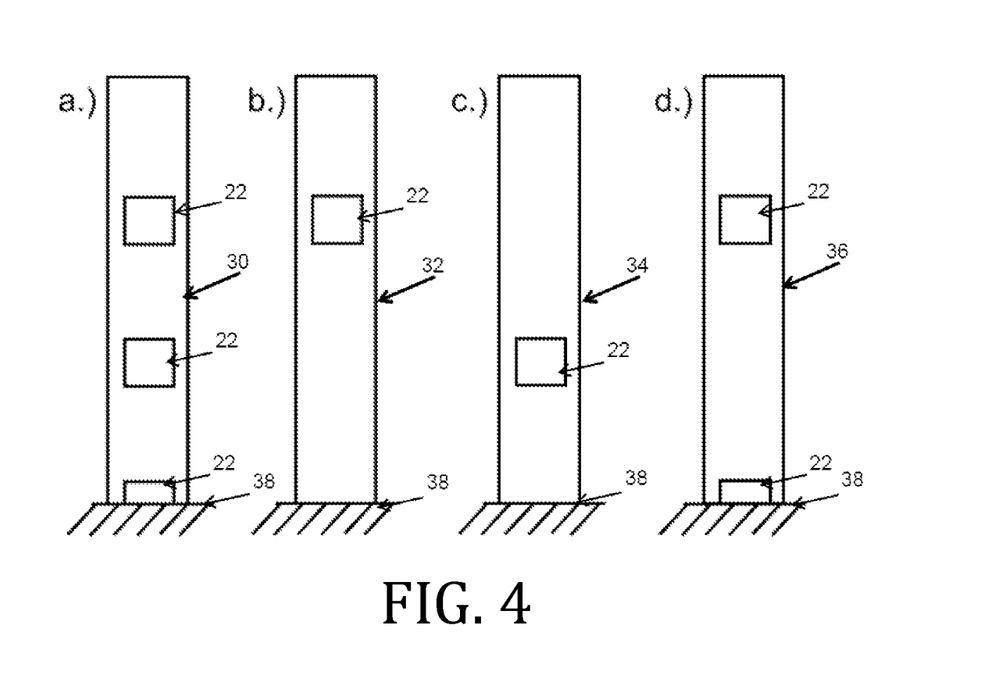
FIG. 4 depicts four beam configurations with respect to a clamped end according to an embodiment of the present invention.

The resulting geometry used to demonstrate the damping capability is illustrated in the diagram shown in FIG. 3. The drawing shows a single beam 20 with three pockets 22. Four beams with different internal configurations can be manufactured based on the single beam shown in FIG. 3. FIG. 4 illustrates the four unique beams 30, 32, 34, and 36 with respect to a clamped end 38 and test length, showing different configurations of pockets 22. Note, the two and three pocket beams 30 and 36 have half of an unfused powder pocket 22 inside the clamp 38. The clamp portion of unfused powder is deemed to have negligible effects on the damping results.

Figure 5:
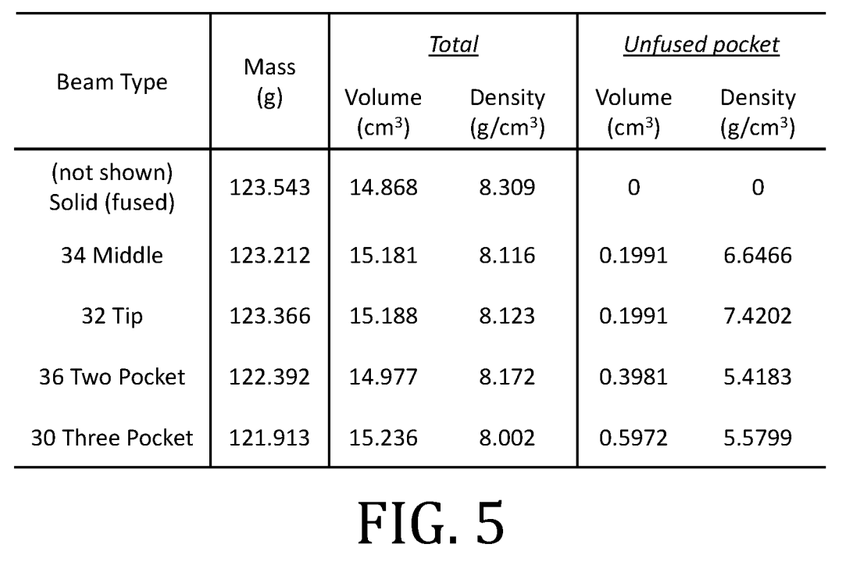
FIG. 5 depicts weight and geometry measurements for LPBF beams according to an embodiment of the present invention.
Figure 6:
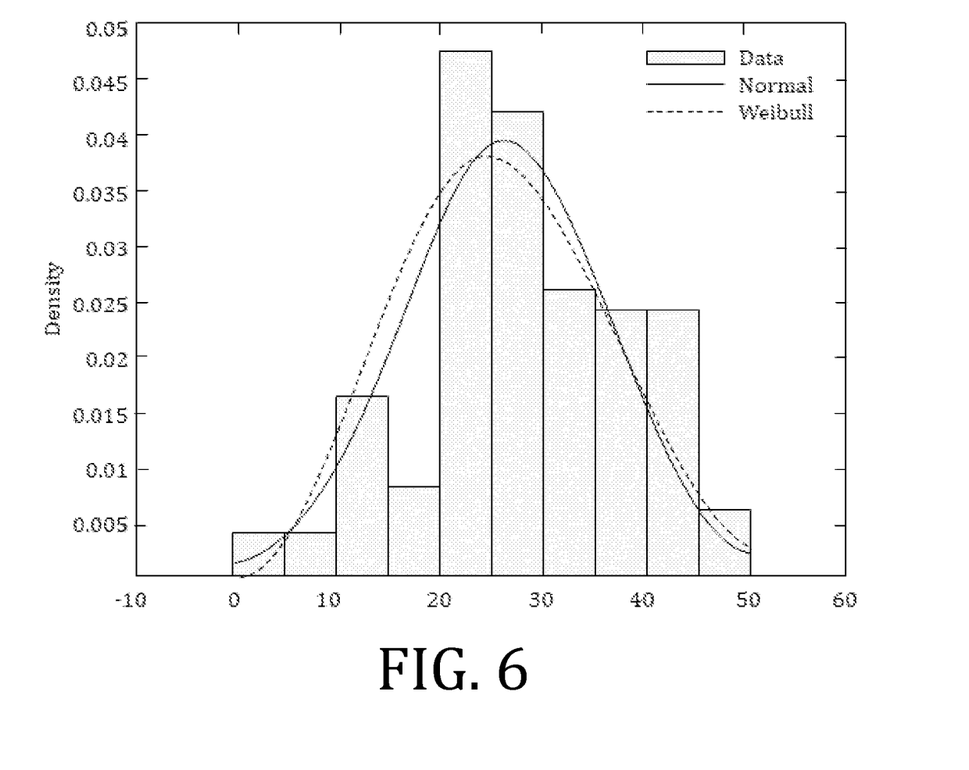
FIG. 6 depicts a particle distribution of a gas atomized Inconel 718 according to an embodiment of the present invention.

The exterior dimensions of five manufactured beams (one solid is included but not shown) are acquired using an ATOS blue structured light scanner. Total mass for each beam 30-36 is measured with an Acculab Precision balance. Both the geometric and mass measurements are used to determine overall component density. The results for each beam 30-36 are listed in the table shown in FIG. 5. Using nominal internal geometries, the density of the unfused pocket is measured. Assuming the individual powder particles have the same density as the fused material and are equal sized spheres, the close packed unfused particle inside the pocket should be ~74% of what a fused volume would be. The average density of the four beams with unfused powder pockets is 75.4% of fused; the minimum is 65.2% and the maximum of 89.3% of fused. Particle distribution is shown in FIG. 6.

Forced-response tests are conducted on cantilevered Inconel 718 beams 30-36 with the geometric dimensions illustrated in FIGS. 3 & 4. The excitation for the vibration test is supplied with a 90 kN Unholtz-Dickie electrodynamic shaker. The shaker is controlled with a Vibration Research VR9500 controller, and an Endevco 2271A charge-type accelerometer is used to monitor shaker head acceleration and control voltage supply. Another instrument used during testing is a Polytec OFV-505/5000 single-point laser vibrometer system for velocity response measurement of the test article. The velocity frequency response from the laser vibrometer is the data used to assess damping behavior.

The first set of forced-response tests conducted on the shaker are sinusoidal sweeps. These tests are conducted to determine the damping behavior of each beam 30-36 via the half-power bandwidth method. All five of the LPBF beam specimens 30-36 undergo sinusoidal sweeps across short frequency bandwidths spanning 1st, 2nd, and 3rd bending modes. The rate of each sweep is set by assessing half-power bandwidth from a fast sweep (+1000 Hz per minute) and dividing the frequency range by one minute; thus, each sweep is three minutes long across three bandwidths of the natural frequency. The base excitation for each sweep is set at 0.1 g acceleration (g is gravitation constant 9.81 m/s$^2$). This value is chosen for base acceleration so that beam response deflection is minimized and the effects of clamp motion is reduced. From these sweeps, using the half-power bandwidth method, the damping quality factor Q (inverse of loss factor η) is calculated for each beam. Results are listed in the table shown in FIG. 7.

Figure 7:
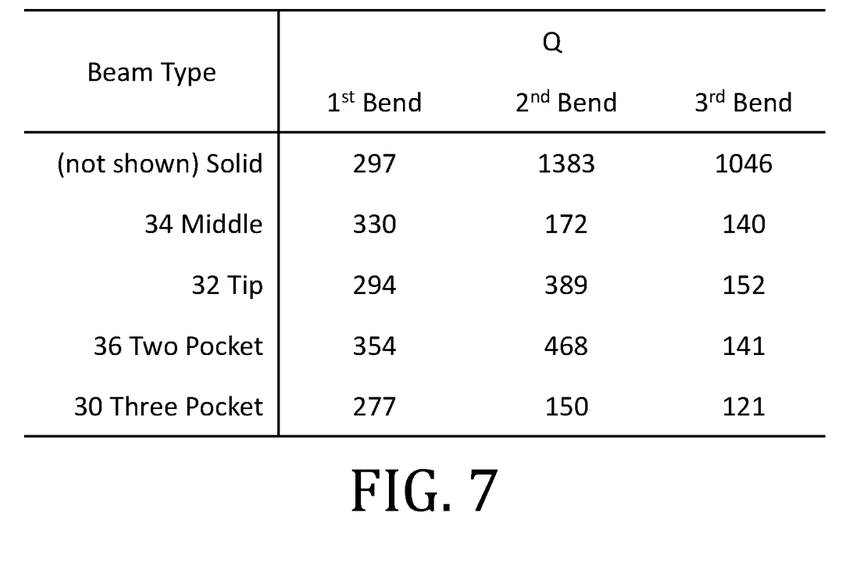
FIG. 7 depicts damping results at a first, second, and third bending mode according to an embodiment of the present invention.
Figure 8:
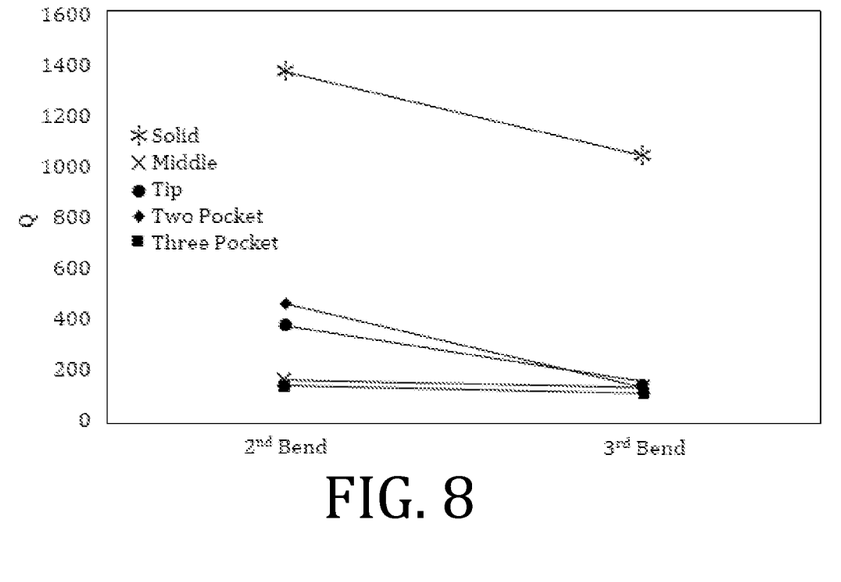
FIG. 8 depicts a damping comparison from sinusoidal sweep tests at a second and third bending mode according to an embodiment of the present invention.

Data from the 1st bending mode is often discarded during damping analysis. This philosophy is based on the effects of large tip deflections which dissipates energy during system operation via motion in the clamp. The results in FIG. 7 give credence to the philosophy as the 1st bend Q values (column 1) are roughly the same for all five beams 30-36. To understand the damping capability of the unfused pocket beams, Q values from 2nd and 3rd bend only are observed. These values are plotted in FIG. 8 for better comparative observation. The results show that the unfused powder pocket beams have significant damping capability. Furthermore, closer observation also shows a frequency dependence on the damping capability. The comparisons of the four beams 30-36 with unfused powder to the solid beam (not shown) at 3rd bend show a 10× increase in damping. The 2nd bend results shows greater Q values (less damping) than 3rd bend, but damping performances are still proven to be effective.

Figure 9A:
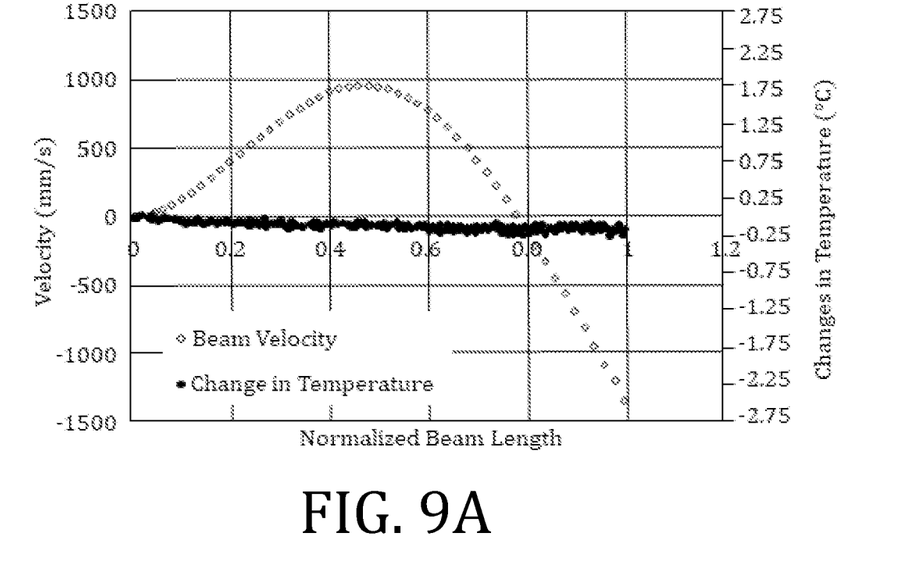
FIG. 9(A) depicts a change in temperature and velocity at maximum amplitude for a solid beam according to an embodiment of the present invention.
Figure 9B:
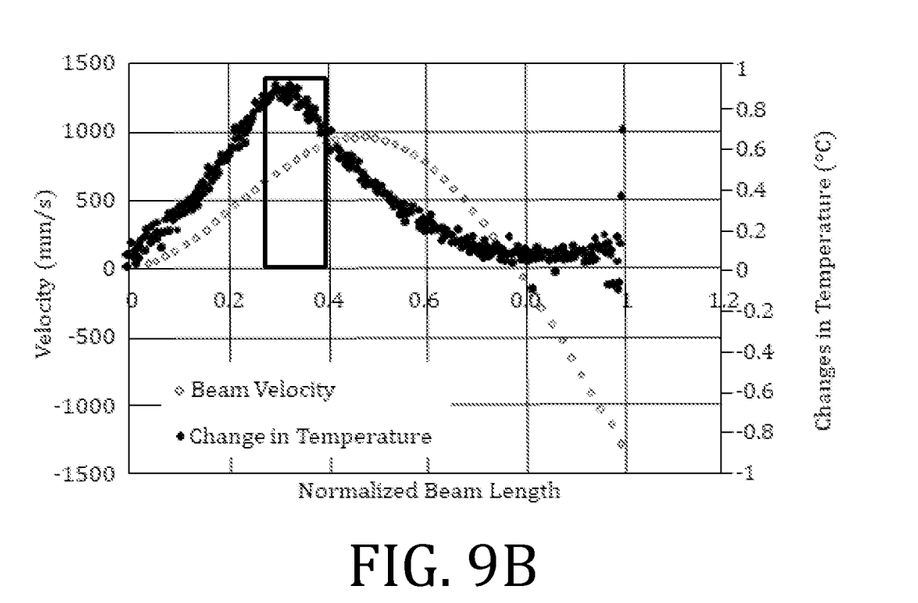
FIG. 9(B) depicts a change in temperature and velocity at maximum amplitude for a middle pocket beam according to an embodiment of the present invention.
Figure 9C:
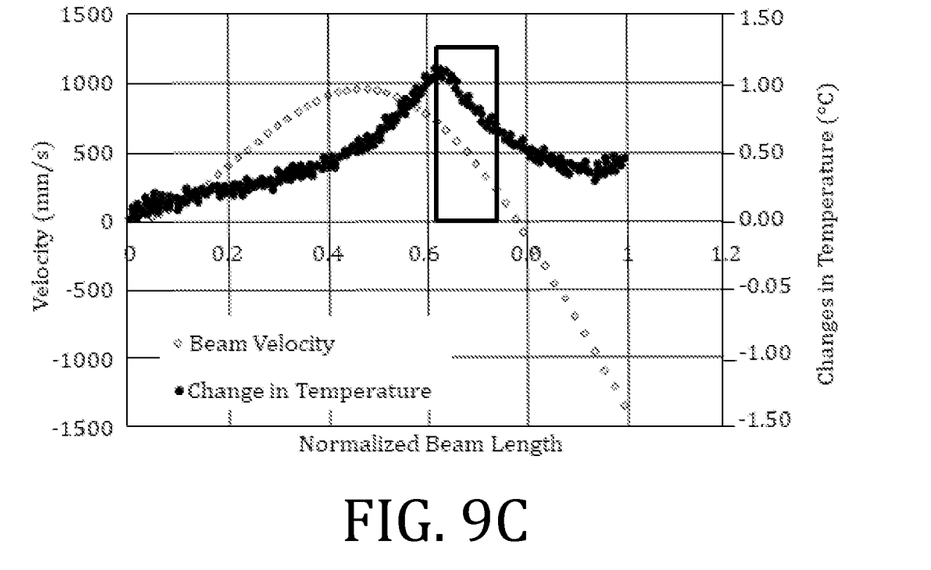
FIG. 9(C) depicts a change in temperature and velocity at maximum amplitude for a tip pocket beam according to an embodiment of the present invention.
Figure 9D:
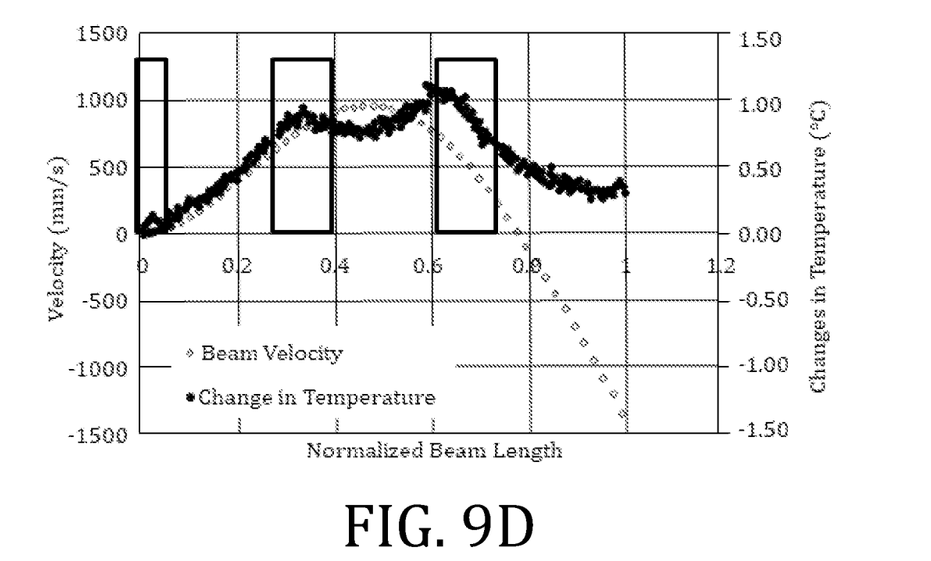
FIG. 9(D) depicts a change in temperature and velocity at maximum amplitude for a three pocket beam according to an embodiment of the present invention.

The first observation conducted on the beams 30-36 verified that friction (thus particle sliding) is a key contributor to the damping mechanism of the unfused powder. This observation studies results from sinusoidal dwell forced-response tests with a FLIR thermal imaging system. Temperature distribution along the top surface of each beam 30-36 is monitored for two minutes at a relatively constant frequency. The maximum strain amplitude for these tests are held at a constant value to assure control of the comparison. Using beam theory as a reference, the targeted strain value is ~500 microstrain, and the response is controlled during testing by monitoring the associated velocity of 1200 mm/s at ~2.5 mm from the free end (i.e. the tip) of the beam. The results from the forced-response tests are plotted alongside the spanwise velocity of the beam in FIGS. 9(A)-(D) for the solid (not shown), middle pocket 34, tip pocket 32, and three pocket beams 30. The normalized temperatures plotted with FIGS. 9(A)-(D) is the change in temperatures with respect to the clamped end 38 of the beam 30-34. If friction within the unfused powder pockets 22 is a factor, the clamped end 38 of the unfused pocket beams 30-34 should act as a heat sink to the temperature increase from the pockets 22 throughout the beam 30-34. For the solid beam, however, the clamped end should have the highest temperature because friction in an undamped beam is assumed to be the highest at the clamp. FIGS. 9(A)-(D) support these understandings regarding friction in the cantilevered beam systems; FIG. 9(A) has a negative delta in temperature with respect to the clamp temperature, and the remaining FIGS. 9(B)-(D) show temperature increases at the unfused powder pockets 22 (denoted by the boxes). These findings regarding temperature and the correlation to friction energy are important for understanding the mechanisms of unfused powder particle damping.

In one embodiment, the powder used is produced by the GA process. Though most of the powder particles are spherical, there are still many non-spherical geometries and particles with satellites. Some particles have internal porosity which is caused by entrapped gas during the atomization process. GA feedstock is known to have the lowest flowability of conventional atomization processes due to the aforementioned irregular particle shapes and satellites. In the case of damping, the difficulty of GA particle flow during vibration loading may be more beneficial for energy dissipation. However, the same facets that restrict flowability could also lead to full powder immobility, thus minimal energy dissipation. Therefore, the suggestion going forward would be to use feedstock with better flowability; in other words, use powder with more spherical shapes, less porosity, and smooth surfaces (no satellites). This suggestion points to the use of either Plasma Atomized (PA) or Plasma Rotating Electrode Process (PREP) powder. Both the PA and PREP process are known to have highly spherical and smooth geometries, and are less likely to have porosity. Though they do not seem like optimal feedstock choices for generating damping, PA and PREP may allow for more consistent component modeling and damping prediction. Reused GA powder is also an option for better flowability feedstock. With reuse, these particles become less spherical, but flowability is improved due to the reduction of satellites.

Figure 10A:
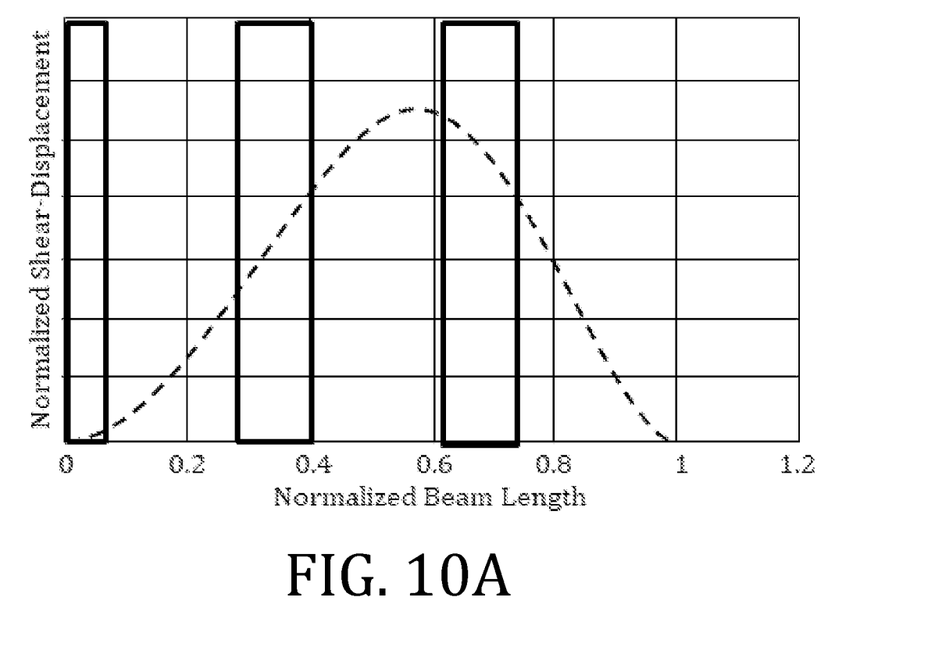
FIG. 10(A) depicts a normalized shear force and displacement for a first bend according to an embodiment of the present invention.
Figure 10B:
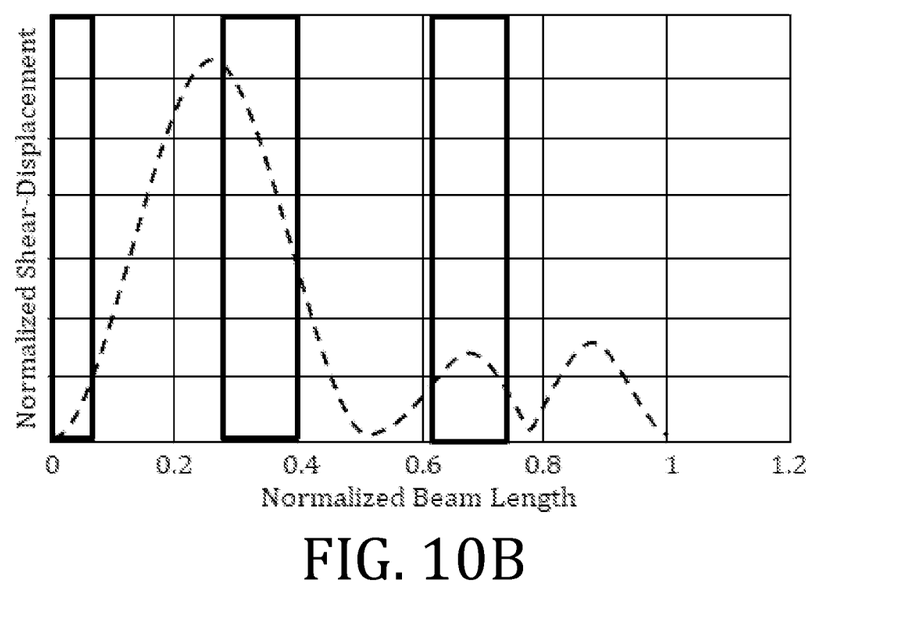
FIG. 10(B) depicts a normalized shear force and displacement for a second bend according to an embodiment of the present invention.
Figure 10C:
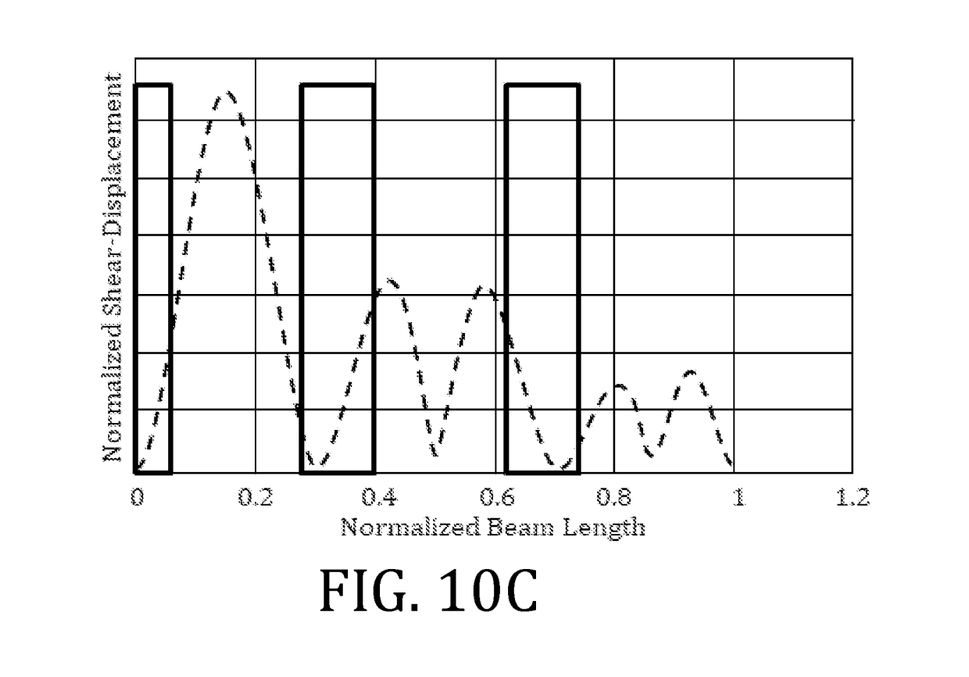
FIG. 10(C) depicts a normalized shear force and displacement for a third bend according to an embodiment of the present invention.

The visual observations of the expression in Eq. (6) and the first three respective bending modes are plotted on FIGS. 10(A)-(C). The boxes in the figures denotes unfused powder pocket locations 22. Note, though the figures show the pocket locations of the three pocket beam, the pocket locations for the other beams are in the same location: see FIGS. 3 and 4 for reference. Therefore, an understanding of the damping mechanism can be inferred from FIGS. 10(A)-(C). The results agree that the three pocket beam 30 should have the best damping for all the bending modes (see FIG. 7). The middle pocket beam 34 has the second best performance at 2nd bend: FIG. 10(B) supports the results. At 3rd bend, however, the middle pocket beam 34 is not significantly different than the tip or two pocket beams 32, 36. Again, the comparisons are supported by the plot of the Eq. (6) expression in FIG. 10(C). The two pocket beam 36 provided surprisingly worse damping results than the middle pocket beam 34 at 2nd bend: FIG. 10(B) agrees with this response as well.

Figure 11:
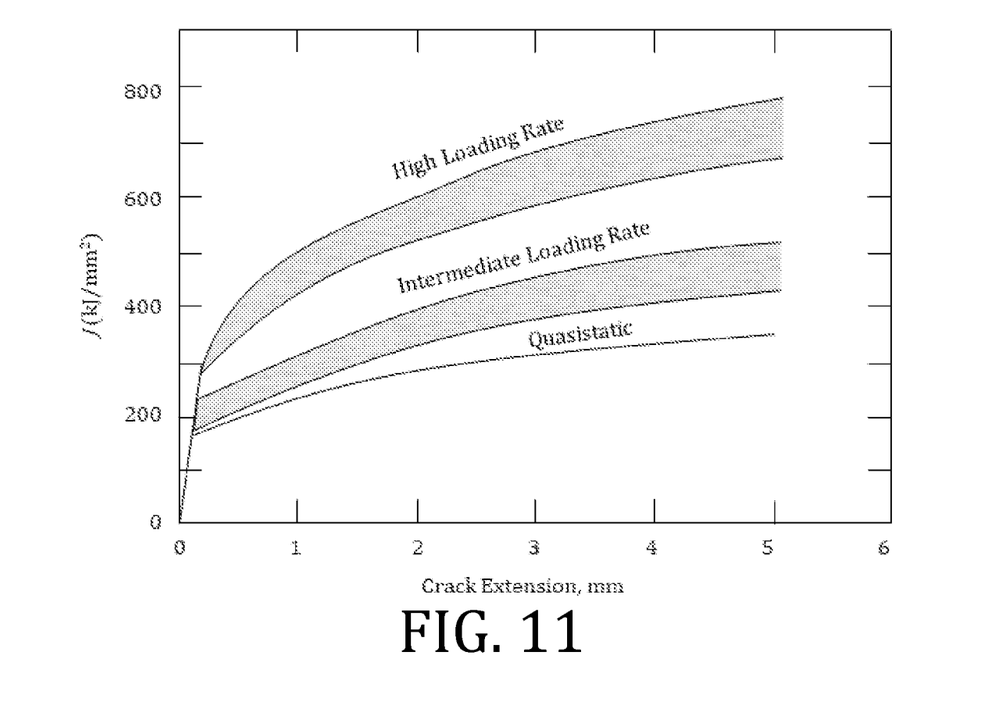
FIG. 11 depicts an effect of energy release rate and crack extension with respect to loading rate according to an embodiment of the present invention.

Further support of the empirical Q results in FIG. 7 can been seen on the plot of FIG. 11. The plot shows J integral behavior with respect to crack length and loading rate for high strength steel, and the results show that J increases with loading rate. Since J for linear elastic behavior is G, FIG. 11 supports the theory that energy dissipation per cycle is increasing with frequency. Therefore, Q should decrease (i.e. more damping) from 2nd to 3rd bend in beams with unfused powder pockets as shown in FIG. 7.

Figure 12:
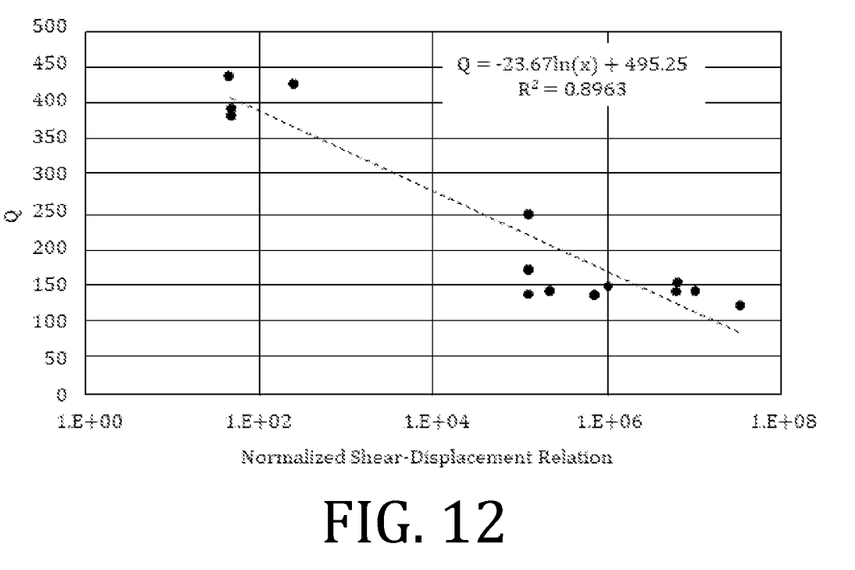
FIG. 12 depicts normalized shear force and displacement compared to corresponding to damping quality factor from swept sine tests according to an embodiment of the present invention.

The numerical results of the expression in Eq. (6) is plotted against empirical Q values (FIG. 7) in FIG. 12. The comparison shows an 89.6% coefficient of determination on a semi-log regression fit. The deviation in the comparisons can be attributed to assumptions regarding a perfectly clamped-free beam condition. Nonetheless, the plot in FIG. 12 further supports the theory that the expression in Eq. (6) can be used as a means to optimize the placement of unfused powder pockets for maximizing damping performance.

The laser powder bed fusion AM process has been used to manufacture components with unique internal geometries that are capable of increasing system damping. The concept of the internal design is to have densely packed, unfused powder pockets that dissipate energy via particle interaction. The capability of four Inconel 718 beams with unique internal designs were validated with sine sweep tests and demonstrated 10 times damping capability. Further investigation was conducted to understand particle interaction and identify the mechanism for energy dissipation. First, the average density of the internal pockets were determined to be on par with that of close-packed particles. Therefore, the particle motion is restricted to sliding. Second, a thermal distribution study at relatively high strain validated heating in the beam around the location of pockets, further supporting particle sliding motion. The theory of this motion was said to be similar to a crack opening under mode II fracture. Based on this assumption, it was defined that the mechanism optimal damping performance was proportional to energy release rate of a mode II fracture. The results of the proportional expression are supported by the damping properties defined in the forced-response beam sweep.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method of manufacturing a component an internal feature therein, the method comprising:
    developing a component design of the component;
    using the component design,
    optimizing a location of the internal feature of the component to be manufactured using powder fusion additive manufacturing (PFAM) based on an energy release rate being proportional to the third derivative of a component shape function and the shape function itself; and
    manufacturing the component using the optimized component design and a powder fusion additive manufacturing (PFAM) process based on an energy release rate being proportional to the third derivative of a component shape function and the shape function itself,
    wherein the internal feature comprises one or more cavities having unfused powder disposed therein to provide vibration dampening.

2. The method of claim 1, wherein using PFAM further comprises:
    operating an energy source comprising a laser or an electron beam.

3. The method of claim 1, wherein PFAM further comprises:
    laser powder bed fusion additive manufacturing (LPBFAM).

4. The method of claim 1, wherein the internal feature of the component includes a tip cavity and a middle cavity.

5. The method of claim 1, wherein the component is formed from Inconel.

6. The method of claim 1, wherein the unfused powder is a gas atomized powder, a reused gas atomized powder, a plasma atomized powder, or a plasma rotating electrode process powder.

7. The method of claim 1, wherein the component is formed from a nickel alloy, a titanium alloy, a cobalt-chrome alloy, or a ferric-based alloy.

8. The method of claim 1, wherein using PFAM further comprises:
    operating an energy source selected from the group consisting of a directed energy deposition machine, an electron beam machine, a direct metal laser sintering machine, a direct metal laser melting machine, and a selective laser melting machine.

* * * * *